United States Patent [19]
Saxe

[11] 3,850,486
[45] Nov. 26, 1974

[54] COOLED COUNTER DISPLAY CASE FOR PACKAGED EDIBLE PRODUCTS

[76] Inventor: Leo C. Saxe, 10907 Annapolis Rd., Bowie, Md. 20716

[22] Filed: Apr. 24, 1973

[21] Appl. No.: 354,097

[52] U.S. Cl.................... 312/116, 62/458, 312/236
[51] Int. Cl.......................... A47f 3/04, A47b 77/08
[58] Field of Search .......... 312/126, 116, 117, 236; 206/45, 45.33; 62/246, 251, 256, 458

[56] References Cited
UNITED STATES PATENTS

| | | | |
|---|---|---|---|
| 1,589,002 | 6/1926 | Smith | 312/117 |
| 2,504,911 | 4/1950 | Whitecar | 62/457 |
| 2,555,425 | 6/1951 | Stern | 62/458 X |
| 3,651,930 | 3/1972 | Artz | 206/45.33 |

Primary Examiner—Casmir A. Nunberg
Attorney, Agent, or Firm—Clarence A. O'Brien; Harvey B. Jacobson

[57] ABSTRACT

A display case incorporating a display surface constructed to receive and support packaged edible products in a manner to enable observation thereof by potential customers and incorporating an enclosed space inwardly of the displayed products receiving a cooling agent to reduce the temperature of the enclosure and the products which have a portion of their periphery received in the enclosure with the products themselves providing a closure for the openings which receive the products.

5 Claims, 8 Drawing Figures

COOLED COUNTER DISPLAY CASE FOR PACKAGED EDIBLE PRODUCTS

BACKGROUND OF THE INVENTION

1. Field of the Invention

The present invention generally relates to a display case primarily adapted for edible food products and including a coolant disposed interiorly of the case for maintaining the products cooled to preserve them for an extended period of time with the food products being inserted through open areas in the case for exposure to the cooled conditions interiorly of the case and the food products themselves defining a closure for the open areas.

2. Description of the Prior Art

Many efforts have been made and many devices have been used for maintaining perishable goods such as food products at reduced temperature levels in order to preserve such products and prevent spoilage thereof. In various commercial establishments such as supermarkets, food stores, restaurants and the like, it is desirable for the food products to be observable by customers. This has led to the use of various refrigerated cabinets having openable transparent doors, chest type refrigerated cabinets and the like. Also, in present day distribution of certain food products, especially sandwiches, pies, cakes and the like, the food products are sold as an individually consumable item. For example, sandwiches of various types are prepared and individually wrapped with appropriate labeling, pricing and the like thereon and displayed on a counter for sale to customers. However, such packaged sandwiches are usually not refrigerated or cooled thus causing them to become stale, spoiled or unsuitable for consumption after storage on a counter top display for a certain time period. Examples of this type of operation are found in restaurants, snack bars or the like catering to motorists and travelers utilizing trains, buses, airplanes and the like. In order to reduce spoilage and satisfy certain regulations, food products of this type frequently are retained in refrigerated cabinets located rearwardly of a counter thus requiring a customer to ask what types of food products are available and then request that an attendant obtain the desired food product from the refrigerated cabinet thereby requiring considerable expenditure of time and effort and reducing the overall efficiency of the selling of food products of this type.

SUMMARY OF THE INVENTION

The present invention has for its object the provision of a cooled display case for positioning on the counter or other observable area of a snack bar, quick food restaurant or the like having openings therein receiving food products with the food products forming a closure for the openings and being cooled by a coolant provided in the enclosed internal area of the display case.

Another object of the invention is to provide a display case in which the coolant is in the form of a freezable liquid disposed within a container and removably oriented in a drawer or other similar structure to enable the coolant in the case to be easily replaced and without requiring expensive refrigerating cools or the like to be incorporated into the case.

Still another object of the invention is to provide a display case for receiving triangular shaped packaged sandwiches or similar food products including a display panel having openings therein closely receiving the food packages with the food packages including a peripheral flange at their largest edge supported in substantially sealing engagement with the periphery of the openings receiving the food products or packages with the food products or packages being displayed not being dispensed to customers but displaying the types of food products available for sale so that the customer is not required to inquire as to the types of food products available for sale but yet will be able to observe the food products to enable him to make a desired selection for purchase from a refrigerated supply of such food products which may be located behind a counter or the like.

Yet another feature of the invention is to provide a display case constructed of readily available and inexpensive materials for rendering the device economically feasible with the display case being provided with an inclined display surface or a vertical display surface and covered with a transparent panel or cover member if desired and constructed with a sliding or removable panel if desired to enable the entire quantity of displayed products to be removed and placed in a refrigerated area or to enable replacement of any of the desired products during use of the device.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
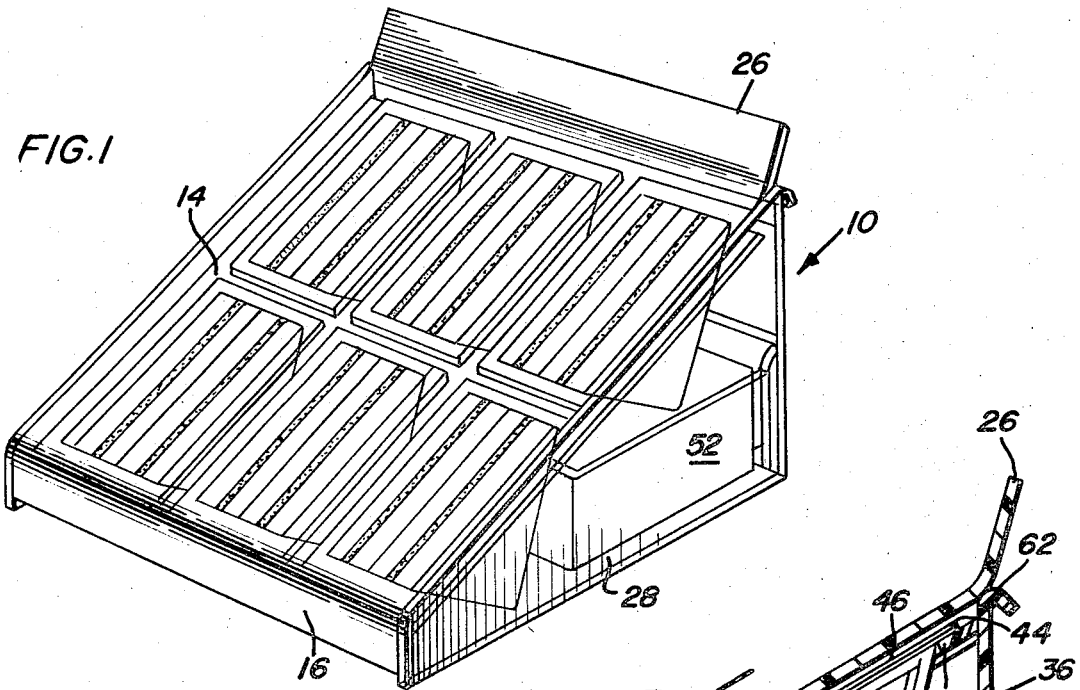
FIG. 1 is a perspective view of the display case of the present invention having an inclined display panel.
Figure 2:
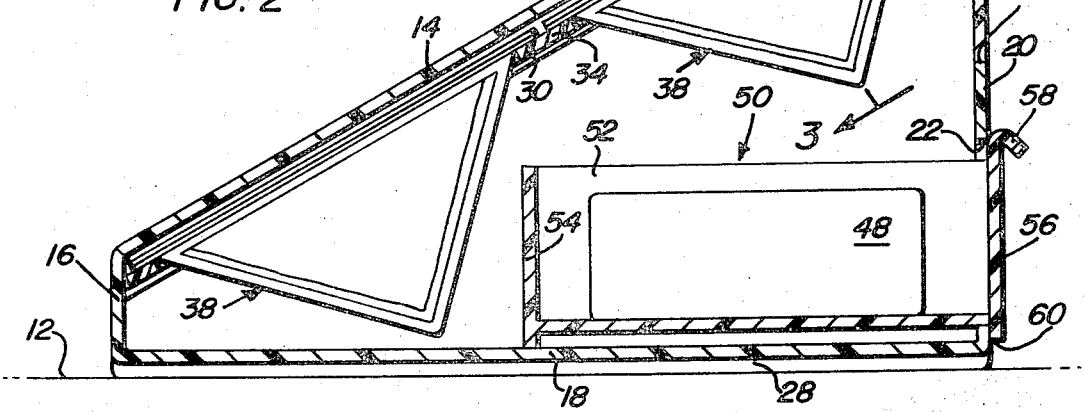
FIG. 2 is a longitudinal, vertical sectional view of the display case of FIG. 1.

Referring now specifically to the drawings, the display case illustrated in FIGS. 1–4 is generally designated by reference numeral 10 and is adapted to be supported on a counter top 12 or any other suitable supporting surface. The display case includes a top panel 14 which is inclined or slanted from the rear upper edge downwardly to a lower front edge with the top panel 14 being continuous with a relatively short front panel 16. The front panel 16 is continuous with a bottom panel 18 which, in turn, is continuous with a rear panel 20 which is provided with a lower opening 22 and an upper opening 24 for a purpose described hereinafter. Also, the top panel 14 is provided at its rear edge with an upturned flange or wall portion 26 to define an area on which advertising indicia or the like may be provided. The side edges of the display case are defined by side panels 28 which close the space enclosed by the top panel 14, front panel 16, bottom panel 18 and rear panel 20 thus forming an enclosed space below the top panel 14. As illustrated, the bottom edges of the side panels 28 extend slightly below the bottom panel 20 for engagement with the supporting surface 12 as illustrated in FIG. 2.

Figure 3:
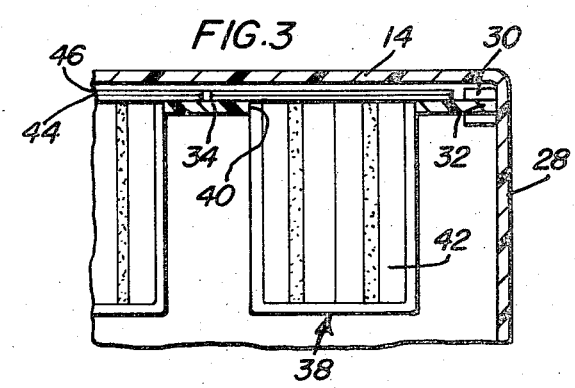
FIG. 3 is a vertical sectional view taken substantially upon a plane passing along section line 3—3 of FIG. 2 illustrating the manner in which the packaged sandwiches are supported from the display panel.
Figure 4:
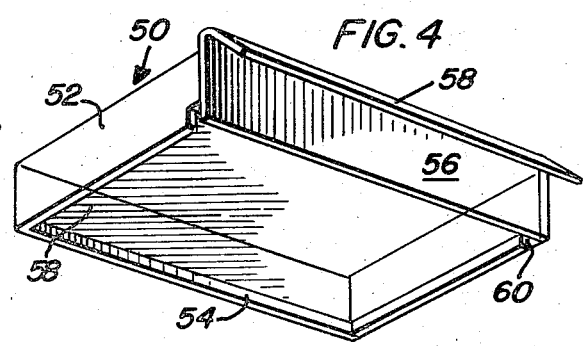
FIG. 4 is a perspective view of the drawer for the coolant.

Each side panel 28 is provided with a pair of runners or guides 30 which are spaced from each other to define inwardly facing grooves or channels 32 which slidably receive a display panel 34 in relatively close underlying relation to the top panel 14 with the display panel 34 being generally of the same size and configuration as the top panel 14 so that when the display panel 34 is slid inwardly from the rear of the display case as guided by the inclined channels 32, the display panel 34 is positioned closely underlying the top panel 14 as illustrated in FIGS. 2 and 3. The rear edge of the display panel 34 is provided with a closure panel 36 which is angularly oriented with respect to and rigid with the panel 34 so that it forms a closure for the upper opening 24 in the rear panel 20 when the display panel 34 is in assembled condition. Thus, the closure panel 36, in effect, completes the rear wall 20 with the upper edge thereof generally engaging the top panel 14 where it merges with the flange 26 and the bottom edge engaging the bottom edge of the open area 24 and the side edges engaging the rear edge portions of the side panels 28.

Insertable into the display panel 34 is a plurality of triangular sandwich packages 38 with the display panel 34 having a plurality of generally rectangular openings 40 receiving the triangular body portion of the sandwich package 38. The triangular body portion is designated by reference numeral 42 and generally is shaped to receive a triangular cut sandwich. The package 38 is provided with a peripheral flange 44 around the periphery of the triangular body portion 42 with the flange resting against the upper surface of the display panel 34 as illustrated in FIGS. 2 and 3. The open end of the package 38 is closed by an overlying closure panel or cover member 46 so that the sandwich package 38 is a complete sealed item with each sandwich package 38 being inserted through an opening 40 and having its flange 44 resting against and sealing against the upper surface of the display panel 34. Thus, the sandwich packages actually seal the openings 40 with the flanges 44 serving to support the sandwich package 38 from the opening and from the display panel.

Disposed interiorly of the display case is a coolant 48 in the form of a container having a freezable liquid therein so that the container may be placed in a suitable freezer and the liquid therein frozen and this assembly may then be inserted into the enclosure defined by the display case. The coolant 48 is received in a drawer 50 having end walls 52, a front wall 54 and a rear wall 56 connected by a bottom wall 58 spaced slightly above the bottom edges of the corresponding walls. The rear wall 56 provides a closure for the bottom opening 22 in the rear panel 20 of the display case when the drawer is inserted fully into the display case thus forming a complete enclosure for the coolant 48 so that the coolant may reduce the temperature of the interior of the display case and such cooled temperature will come into contact with the sandwich packages 38 and the sandwiches therein for maintaining them in a cooled condition.

The rear wall 56 of the drawer is provided with a reversely bent flange 58 at its upper edge defining a handle for the drawer to facilitate manipulation thereof. Also, the bottom edge portion of each end wall 52 is provided with a notch 60 adjacent the inner surface of the rear wall 56 and which receives the bottom edge of the lower opening 22 as illustrated in FIG. 1 when the drawer is completely inserted thereby retaining the drawer in closed position and requiring that the rear portion of the drawer be elevated in order to slide the drawer outwardly. Also, a suitable handle 62 is provided on the wall 36 to facilitate movement of the display panel 34 and sandwiches carried thereby into or out of the display case.

The sandwich packages are of transparent construction and the top panel 14, at least, is of transparent construction thereby enabling prospective customers to observe the types and quality of the sandwiches or other food products available so that such products then may be requested from an attendant with the products on display in the display case not being sold directly to customers. However, the coolant will maintain the sandwiches in a cool condition to prolong the useful life thereof and to retain them in an attractive condition. The entire device may be constructed of a transparent material if desired and the shape and size of the components may vary depending upon the number of sandwiches or other food products to be displayed and various materials may be used for constructing the device including plastics, woods, metals or any combination thereof so that the device may be constructed in a relatively inexpensive manner but with the display case being relatively airtight so that the coolant will maintain the temperature within the display case at a desired level for a relatively long period of time.

Figure 5:
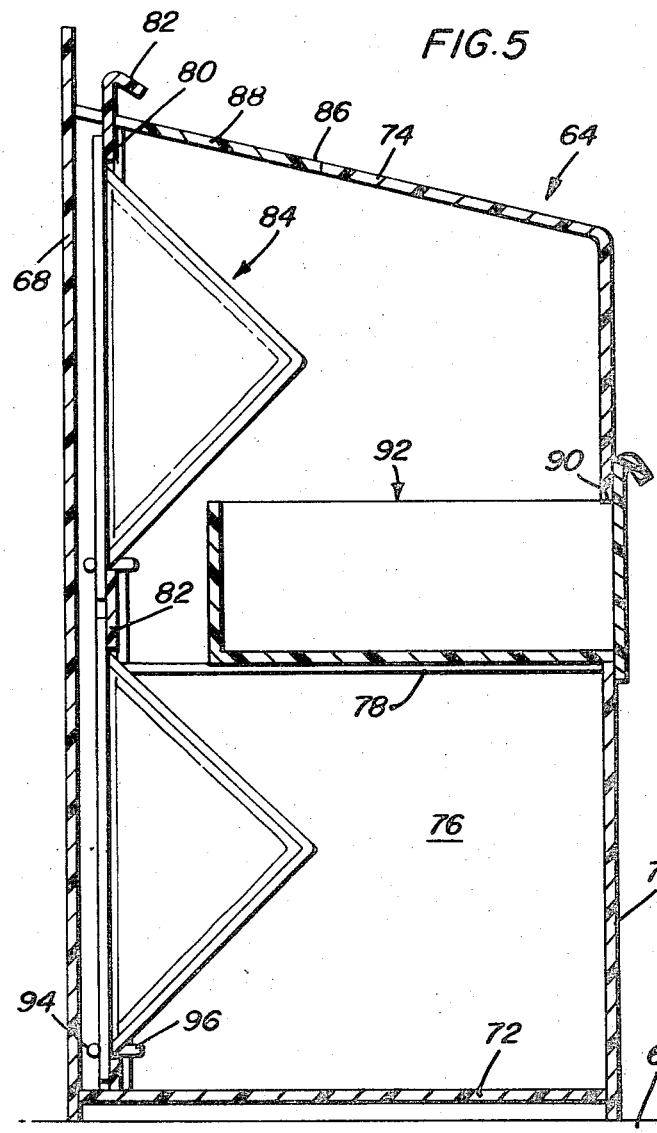
FIG. 5 is a vertical sectional view of an upright type of display case.
Figure 6:
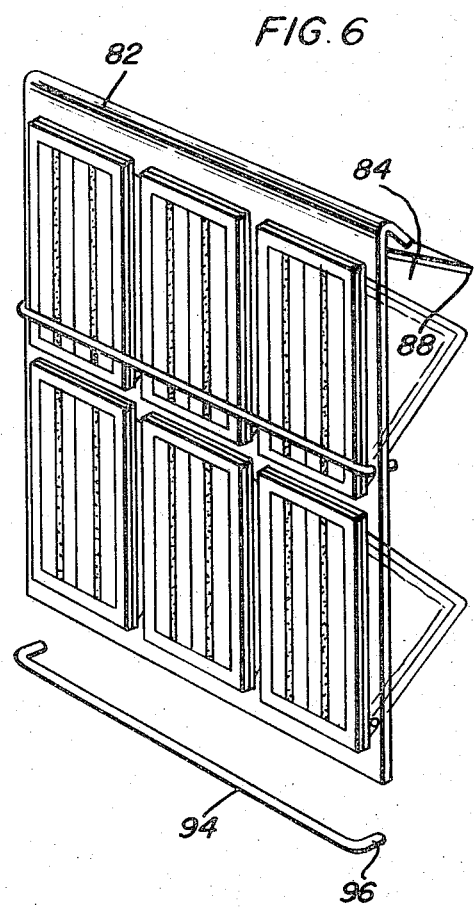
FIG. 6 is a perspective view of the display panel and retainers for the packaged sandwiches when the display panel is oriented vertically as in the form of the invention illustrated in FIG. 5.

Referring now specifically to FIGS. 5 and 6, a modified form of the invention is generally designated by numeral 64 which may be considered an upright embodiment supported on a supporting surface 66 and which includes a vertical front panel 68, a vertical rear panel 70, a horizontal bottom panel 72 and a horizontal or inclined top panel 74. These panels are interconnected by vertical side panels 76 to form an enclosure with inwardly extending flanges 78 being provided centrally of the side panels 76. The bottom panel 72 is spaced above the bottom edges of the peripheral panels and the side walls or panels 76 include vertical flanges 80 receiving the display panel 82 which has apertures or openings therein receiving the sandwich packages 84 which is the same structure as defined in conjunction with FIGS. 1–4. The top panel 74 is provided with an opening 86 and an inclined closure panel 88 rigid with the display panel 82 and provided with a suitable handle to enable the assembly to be lifted out of the display case. The rear wall 70 is provided with an opening 90 receiving a coolant drawer 92 which is the same as that illustrated in FIGS. 1–4. In this device inasmuch as the display panel 82 is oriented vertically, the sandwich packages 84 are retained in the openings therein by retaining rods 94 which have inturned ends 96 extending through apertures in the display panel 82 and secured thereto in any suitable manner such as by friction or a retainer of any type. This arrangement will prevent the bottom edges of the sandwich packages from sliding forwardly and downwardly along the edges of the openings which receive the sandwich packages thereby enabling the sandwich packages to be retained in the position illustrated in FIG. 6 in relation to the display panel 82 for retaining the sandwich packages in the desired position and preventing them from becoming disarranged while in the display case and also enabling them to be lifted out of and placed in the display case without possibility of falling out of or otherwise becoming displaced from their association with the display panel 82.

Figure 7:
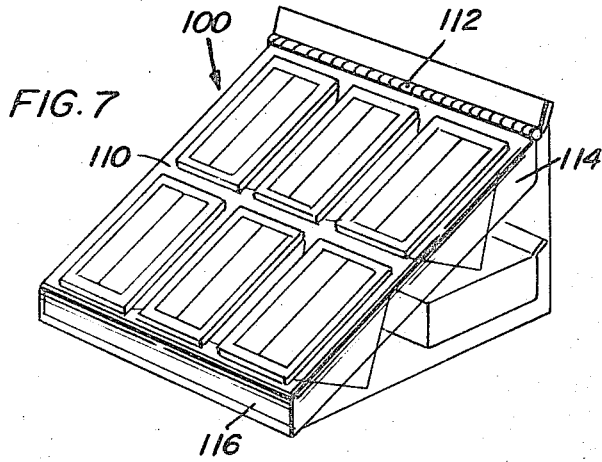
FIG. 7 is a perspective view of another embodiment of the invention in which a hinged cover is provided.
Figure 8:
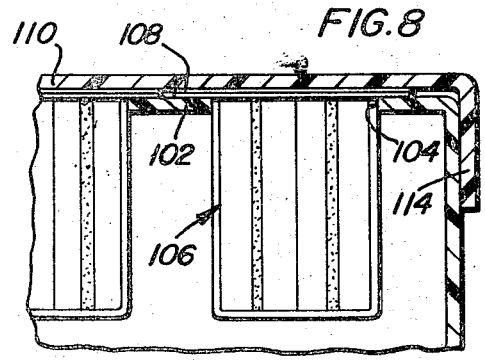
FIG. 8 is a fragmental sectional view of the construction of FIG. 7 illustrating the relationship of the cover to the display panel and the unitary construction of the display panel with the remainder of the case.

Referring now specifically to FIGS. 7 and 8 of the drawings, the display case illustrated therein is generally designated by the numeral 100 and is substantially the same as that illustrated in FIGS. 1–4 insofar as the orientation of components is concerned. However, in this arrangement, the top wall 102 is provided with openings 104 therein to receive the sandwich packages 106 which are the same as the sandwich packages 38 in FIGS. 1–4. Thus, the display panel and corresponding guides or channels therefor are not used in this embodiment of the invention and the rear wall of the display case is solid above the bottom opening which receives the drawer for the coolant. Thus, the sandwich packages extend through the top wall 102 with the flanges on the top edge of the sandwich packages designated by numeral 108 being supported on the top surface of the top wall 102. The structure may be used in this manner or if desired, a cover panel 110 may be provided in overlying relation to the top panel 102 and the sandwich packages with the rear edge of the cover panel 110 being hingedly attached to the top panel 102 by a suitable hinge device 112. The side edges of the cover panel 110 are downturned as at 114 to overlap the side walls of the display case and the front edge of the cover panel 110 is downturned at 116 to overlap the front edge of the display case. In this arrangement, the sandwiches may be changed, removed or inserted by lifting the cover plate or panel 110 or in the event no cover plate is used, the sandwich packages are removed by directly lifting them from the top panel or placing them in the top panel 102.

In lieu of the rod 94 in FIG. 6, a flange or flanges of hook shaped configuration could be provided on the front surface of the panel 82 to retain the sandwich packages 84 in the openings therein in the same manner as the rods 94. Also, in FIG. 7, the wall 102 may be in the form of a lift out tray seated on suitable peripheral ledges which form a closure for the open top of the case 100. In this arrangement, the cover may be hinged to or telescoped over the tray and case. Any of the removable trays may be provided with a thin cover thereby, in effect, forming a double cover for the sandwiches and case.

The display case may be employed for conveniently displaying packaged and unpackaged food products such as sandwiches, pies, cakes and the like in various shapes and sizes in a compact and highly attractive manner and at the same time preserving their fresh qualities for a much longer time especially when displayed in a room or other area having a relatively warm temperature such as snack bars and waiting rooms, dining cars, aircraft terminals, bus terminals, roadside fast food restaurants, carry out restaurants and the like. The display panel or rack may be in the form of a slidably removable shelf or permanently attached to the display case or liftable therefrom in various manners with the pockets or apertures receiving the displayed items being closed by the items themselves so that the major portion of the items will be exposed to the cool interior temperature of the display case which is maintained in a cool condition by a coolant which may be self-contained and include a freezable liquid. The display case may be supported in various positions and orientations on or above a counter, behind a counter or wherever else that a display of this type may be advantageously located. By constructing the device from transparent materials, the products are attractively displayed and will adequately inform customers of the availability of the products and create a desire for such products by enabling observation of the products by the customers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A display case for food products and the like comprising a display panel having openings therein by virtue of which the major portion of the displayed food products are disposed to one side of the panel, an enclosed space inwardly of the panel, and coolant means in the enclosed space for cooling the enclosed space and the food products oriented inwardly of the display panel with the food products forming a closure for openings in the display panel which receive the food products therethrough, said display panel being removably supported on peripheral wall structure defining the enclosed space of the display case to enable removal of the panel and food products therein as a unit from the display case, said display case including end walls having guide channels therein removably receiving the side edges of the display panel.

2. The structure as defined in claim 1 wherein said display case includes a top panel oriented in inclined position, said display panel being slidable in close underlying relation to the top panel.

3. The structure as defined in claim 1 wherein said display case includes a front panel oriented substantially vertically, said display panel being vertically slidable closely behind the front panel.

4. The structure as defined in claim 3 together with retaining means on the display panel engaging the forward lower portions of the food products supported in the display panel for retaining the food products therein.

5. A display case for food products and the like comprising a display panel having openings therein by virtue of which the major portion of the displayed food products are disposed to one side of the panel, an enclosed space inwardly of the panel, and coolant means in the enclosed space for cooling the enclosed space and the food products oriented inwardly of the display panel with the food products forming a closure for openings in the display panel which receive the food products therethrough, said display case including a slidable drawer, said coolant including a self-contained freezable liquid positionable in the drawer to enable replacement of the coolant, said drawer including means retaining it in closed position with the coolant in the enclosed space and retaining the enclosed space in closed condition, said drawer and freezable liquid defining said coolant means.

* * * * *